United States Patent
Ciccorilli

(12) 
(10) Patent No.: US 6,427,830 B1
(45) Date of Patent: Aug. 6, 2002

(54) CONVEYOR SECTION

(75) Inventor: Claudio Ciccorilli, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 09/128,120

(22) Filed: Aug. 3, 1998

(30) Foreign Application Priority Data

Aug. 8, 1997 (DE) .......................... 197 34 314

(51) Int. Cl.⁷ .............................................. B65G 15/60
(52) U.S. Cl. ..................................................... 198/841
(58) Field of Search ............................ 198/841; 193/38

(56) References Cited

U.S. PATENT DOCUMENTS

| | | | |
|---|---|---|---|
| 2,815,252 A | * 12/1957 | Baker | ............ 193/38 |
| 3,231,460 A | 1/1966 | Andrews | |
| 3,632,459 A | 1/1972 | Klauer | |
| 3,711,090 A | * 1/1973 | Fiedler | ........ 198/841 |
| 3,858,707 A | 1/1975 | Blcck et al. | |
| 5,690,587 A | 11/1997 | Gruenangeri | |

FOREIGN PATENT DOCUMENTS

| | | |
|---|---|---|
| DE | SC 13000 | 10/1956 |
| DE | 1 169 367 | 4/1964 |
| DE | 1 531 867 | 1/1970 |
| DE | 21 24 031 | 11/1972 |
| DE | 24 01 804 | 7/1974 |
| DE | 32 21 868 | 3/1983 |
| DE | 35 18 134 | 11/1986 |
| DE | 37 23 640 | 2/1988 |
| DE | 37 36 292 | 5/1989 |
| DE | 42 08 230 | 9/1993 |
| EP | 0 089 144 | 9/1983 |

OTHER PUBLICATIONS

"Gleitend geführte Förderbänder" pp. 1044, 1046–1051 (1960).
"Woven Teflon–fabric Bearings", Mechanical Engineering, pp. 16–19 (1975).
"Encyklopädie der technischen Chemie", pp. 534–537 (1981).
"Industrie Handbuch", pp. C40–C41 (1994).

* cited by examiner

Primary Examiner—Joseph E. Valenza
(74) Attorney, Agent, or Firm—Kenyon & Kenyon

(57) ABSTRACT

A conveyor section for workpiece containers has a conveyor belt and a conveyor belt guide. A layer is applied between the conveyor belt guide and the conveyor belt at least in regions of the conveyor section, with the coefficient of friction between the conveyor belt and the layer being lower than the coefficient of friction between the conveyor belt and the conveyor belt guide. The layer is also adapted to the relevant environmental conditions of the regions of the conveyor section.

18 Claims, 1 Drawing Sheet

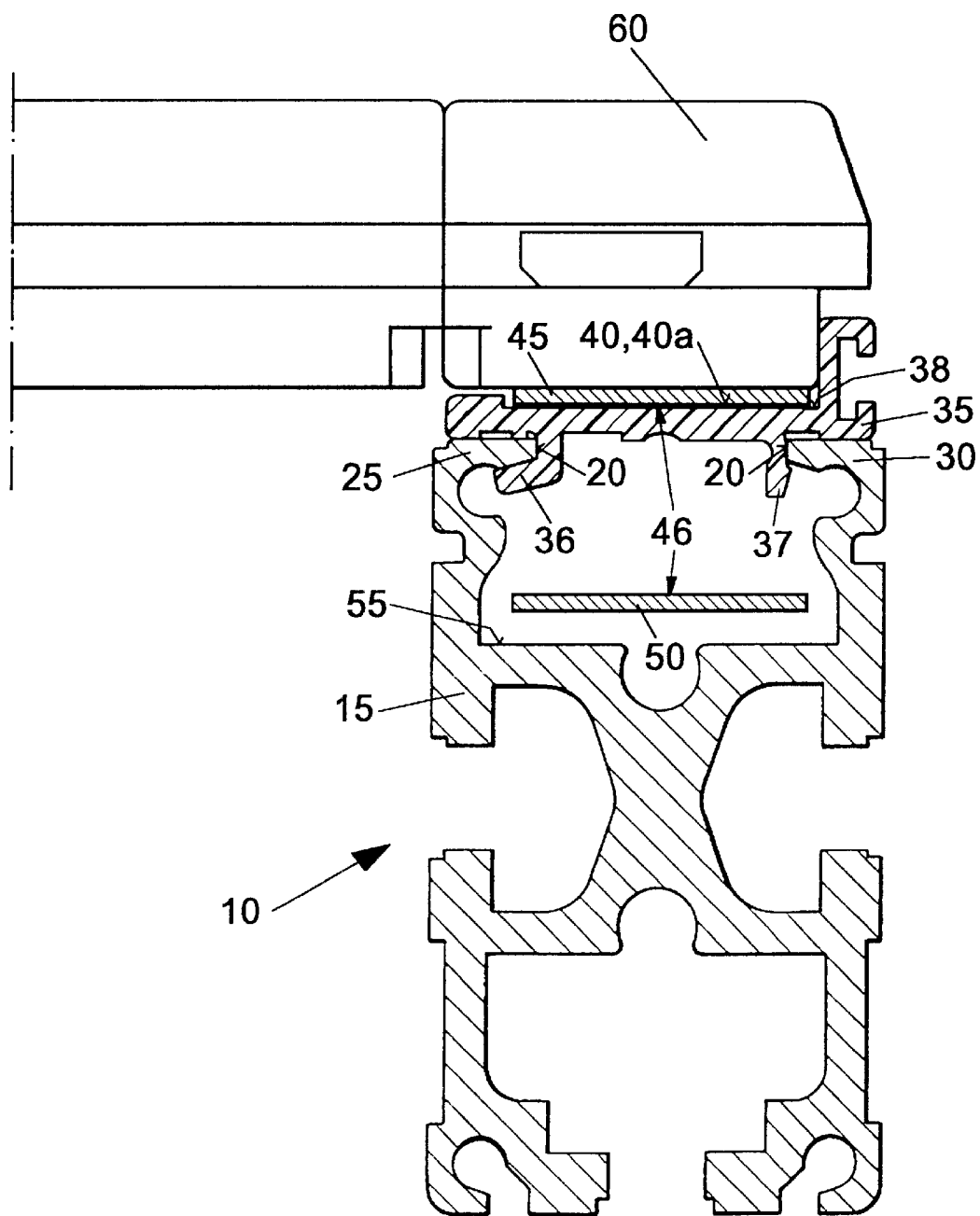

CONVEYOR SECTION

FIELD OF THE INVENTION

The present invention relates to a conveyor section, in particular for workpiece containers.

BACKGROUND INFORMATION

A conveyor section with a guide made of a plastic with good anti-friction characteristics is known from German Patent No. 32 21 868 C2 and German Published Patent Application No. 35 18 134 A1. According to German Published Patent Application No. 35 18 134 A1, friction is further reduced by additionally providing the guide with indentations in a grid pattern (waffle structure). During operation, the indentations in the grid pattern form an air cushion which reduces the friction between the conveyor belt and the guide. In practice, however, this effect has proven to be quite negligible. Instead, the indentations reduce the bearing area between the conveyor belt and the guide. With a steady load pressure exerted by the workpiece container, this increases the surface pressure, which increases wear. In addition, guides are usually extruded. This means that an additional work step is needed in order to produce the indentations.

The product information bulletins "Scotch™, Teflon™-Coated Glass Fabric Tape" (December 1986) and "Scotch™, Anti-Friction Tape, Pressure-Sensitive (February 1988) from 3M Co. describe anti-friction tapes that are used to coat surfaces. They have high anti-friction characteristics and good thermal, mechanical, and chemical stability. The anti-friction tapes are normally used in coin chutes and packing shafts. Their primary purpose is to transport materials without damage.

SUMMARY OF THE INVENTION

The conveyor section according to the present invention provides a greater degree of reduced friction between the conveyor belt guide and the conveyor belt.

The anti-friction characteristic and thermal, mechanical, and chemical stability of the various anti-friction tapes according to the present invention can optimize the characteristics of a conveyor belt guide in each region of a conveyor section.

A pressure-sensitive anti-friction tape or a varnish can be easily applied to a conveyor belt guide at a later date. This makes it possible to influence friction in a region of a conveyor section even after it is assembled. In particular, a pressure-sensitive anti-friction tape has a further advantage in that it can be easily removed again.

BRIEF DESCRIPTION OF THE DRAWING

The FIGURE shows a cross-section of the one conveyor section of a twin-belt conveyor for workpiece containers in industrial manufacturing.

DETAILED DESCRIPTION

Conveyor section 10 of a twin-belt conveyor shown in the figure has a mounting rail 15 produced by aluminum extrusion which has a box-type contour of the known type. The upper box wall is provided with a through slot 20 which is limited by two side wall sections 25, 30. These side wall sections 25, 30 serve as a mounting flange for a mounted guide 35 made of extruded polyamide. On the bottom of guide 35 are mounted two hook-shaped extensions 36 and 37, which grip side wall sections 25, 30, enabling guide 35 to engage tightly with mounting rail 15. Guide 35 has a shallow, wide groove 38. An anti-friction tape 40, on which lies one segment 45 of a continuous conveyor belt 46, is attached to this groove 38. Segment 45 is fed laterally through the side walls of groove 38. The other segment 50 of conveyor belt 46 passes through a lower chamber 55 of mounting rail 15 into which slot 20 opens. Workpiece containers 60, which are transported on conveyor belt 46 by friction engagement, lie on conveyor belt 46.

Anti-friction tape 40 can be attached along the entire length of conveyor section 10 or only in critical regions. The critical regions are areas where workpiece container pile-ups frequently occur, for example in front of machining stations. However, it can be useful to use the anti-friction tape even in non-critical regions where, for example, no workpiece container pile-ups occur in order to minimize friction along the entire length of the conveyor section 10. Depending on the environmental conditions, it is possible to provide an anti-friction tape 40 that has characteristics adapted to these environmental conditions. For example, a solvent-resistant anti-friction tape 40 can be mounted in wet areas. An anti-friction tape 40 with high thermal resistance can be used at and downstream from a drying station. An anti-friction tape 40 which has good thermal, mechanical, and chemical stability can, of course, also be used. The important thing is that anti-friction tape 40 adheres well depending on the environmental conditions. "Scotch™, Teflon™-coated glass fabric tape" and "Scotch™, pressure-sensitive anti-friction tape" manufactured by 3M Co. have proven to be especially suitable. However, tests may also reveal other suitable anti-friction tapes 40.

Conveyor belt 46 is usually driven on the side facing guide 35. This is done, for example, using a friction wheel. Attaching anti-friction tape 40 to guide 35 has no effect on the coefficient of friction between conveyor belt 46 and the friction wheel. This coefficient of friction is relatively high, which is necessary in order to prevent high losses when transferring force from the friction wheel to conveyor belt 46.

As previously mentioned, guide 35 is usually made of an extruded polyamide, although guides 35 produced by aluminum extrusion or guides 35 made of polyvinyl chloride (PVC) can also be used. Conveyor belt 46 is often made of polyamide as well. Coefficient of friction $\mu_1$ between two polyamide parts amounts to approximately 0.4 with sliding friction. When using pressure-sensitive anti-friction tapes 40 with a coating made of polyethylene, coefficient of friction $\mu_2$ between the polyamide and polyethylene is around 0.3. If a Teflon™-coated glass fabric tape is used, coefficient of friction $\mu_3$ between the polyamide and Teflon™ is less than 0.3 with sliding friction. However, tests may reveal other suitable pairings as well.

Mounting rail 15 shown in the figure has a slot 20 with which guide 35 engages. This design of mounting rail 15 is common in practice. It enables mounting rail 15 to be also equipped with roller elements instead of just with a guide 35 and a conveyor belt 46. This makes it possible to create roller sections for transporting workpiece containers 60 manually.

Guide 35 is not used if mounting rail 15 is designed without slot 20, but instead has a shallow, wide groove similar to groove 38 of guide 35 in the resulting outer surface. In this case, conveyor belt 46 lies directly on the mounting rail. However, the high friction produced between the polyamide of conveyor belt 46 and the aluminum of the mounting rail (coefficient of friction $\mu_4$ of up to 0.5) can be improved through the use of anti-friction tape 40.

Instead of anti-friction tape 40, it is possible to apply a layer 40a, for example in the form of a varnish or a similar substance, which, like anti-friction tape 40, adheres well. In order to do this, the resulting coefficient of friction must be correspondingly low, and this layer 40a must be adapted to the environmental conditions. Varnishes for electron-beam curing (EBC) are especially suitable. For this purpose, varnishes are applied and cured with an electron beam, which makes them especially hard and gives them a wear-resistant surface.

If conveyor belt 46 is driven from the side facing away from guide 35, or if it is driven according to a different principle, a friction-reducing layer may also be applied to conveyor belt 46 itself. When driven in this manner, friction-reducing layers can even be applied to conveyor belt 46 and to guide 35. This is possible, for example, with a conveyor belt 46 in which the side facing the guide 35 is designed as a toothed belt. This side designed as a toothed belt could then be provided with a varnish layer as described above, at least on the tips of the teeth. This would not apply to driving, since a wheel with a tooth arrangement matching the toothed belt is used instead of a friction wheel. Force is not transferred by friction engagement but rather by positive locking. Friction is minimized by still providing guide 35 with an anti-friction tape 40, for example.

What is claimed is:

1. A conveyor section for a workpiece container, comprising:

at least one conveyor belt;

at least one conveyor belt guide coupled to the at least one conveyor belt; and at least one layer provided between the at least one conveyor belt and the at least one conveyor belt guide in regions of the conveyor section and having at least one adhesive side, wherein a coefficient of friction between one of the at least one conveyor belt and the at least one conveyor belt guide and at least one other side of the at least one layer is lower than a coefficient of friction between the at least one conveyor belt and the at least one conveyor belt guide.

2. The conveyor section according to claim 1, wherein the regions of the conveyor section have different coefficients of friction.

3. The conveyor section according to claim 1, wherein the at least one layer includes an anti-friction tape, and wherein the at least one adhesive side of the at least one layer adheres to the at least one conveyor belt guide.

4. The conveyor section according to claim 3, wherein the anti-friction tape includes a Teflon™-coated glass-fabric adhesive tape.

5. The conveyor section according to claim 3, wherein the anti-friction tape includes a pressure-sensitive adhesive tape.

6. The conveyor section according to claim 1, wherein the at least one layer includes a varnish.

7. The conveyor section according to claim 1, wherein the at least one adhesive side of the at least one layer adheres to the at least one conveyor belt.

8. The conveyor section according to claim 1, wherein the at least one layer includes a first layer and a second layer, wherein the first layer adheres to the at least one conveyor belt, and wherein the second layer adheres to the at least one conveyor belt guide.

9. The conveyor section according to claim 1, wherein the coefficient of friction between the one of the at least one conveyor belt and the at least one conveyor belt guide and the at least one other side of the at least one layer is about 0.3.

10. The conveyor section according to claim 1, wherein the at least one layer includes an anti-friction tape having a polyethylene coating.

11. The conveyor section according to claim 10, wherein the at least one conveyor belt guide includes at least one of polyamide, polyvinyl chloride and aluminum.

12. The conveyor sector according to claim 10, wherein the at least one conveyor belt includes polyamide.

13. The conveyor section according to claim 1, wherein the at least one layer is a varnish that is cured to provide a wear-resistant surface.

14. The conveyor section according to claim 13, wherein the varnish is cured by an electron beam.

15. The conveyor section according to claim 1, wherein the at least one conveyor belt guide includes a groove having side walls, and the at least one conveyor belt is fed laterally through the side walls of the groove.

16. The conveyor section according to claim 15, wherein the at least one layer adheres to the groove.

17. The conveyor section according to claim 1, wherein:

the at least one layer includes a first layer at least as wide as one segment of the at least one conveyor belt; and the one segment lies completely on the first layer.

18. The conveyor section according to claim 17, wherein a bearing area between the one segment and the first layer is the same as another bearing area between the one segment and the at least one conveyor belt guide.

* * * * *